Jan. 24, 1956 A. C. MAGER 2,732,131

TELEPHONE CALL COUNTER

Filed July 19, 1951 2 Sheets-Sheet 1

INVENTOR.
ABRAHAM C. MAGER
BY
Zoltan H. Polachek
ATTORNEY

Jan. 24, 1956 A. C. MAGER 2,732,131

TELEPHONE CALL COUNTER

Filed July 19, 1951 2 Sheets-Sheet 2

INVENTOR.
ABRAHAM C. MAGER
BY Zoltan Polachek
ATTORNEY

United States Patent Office 2,732,131

Patented Jan. 24, 1956

2,732,131

TELEPHONE CALL COUNTER

Abraham C. Mager, Brooklyn, N. Y.

Application July 19, 1951, Serial No. 237,555

2 Claims. (Cl. 235—125)

This invention relates to new and useful improvements in a telephone call counter.

More specifically, the present invention proposes the construction of a call counter for attachment to the dial of a telephone to be readily available for registering each completed outgoing call in a manner so that a saving can be effected by the careful budgeting of the total number of calls allotted during any one billing period.

Another object of the present invention proposes constructing the call counter to include a base having a recess extending in from its bottom face in a manner to be frictionally fitted over the raised portion at the center of the conventional telephone dial.

Still another object of the present invention proposes the mounting of various types of movable counters on the base in a manner to be manually advanced one number as each outgoing call is completed to add that one number to the total previously registered on the counter.

In one form of the present invention it is proposed to characterize the movable counters by adjacent units and tens bands with means for moving the units band one number upon the completion of each call and which units band will function to advance the tens band one number each time the units band completes one revolution in a manner so that calls can be consecutively registered to a total of ninety-nine.

The first modification of the present invention proposes characterizing the movable counters by individually rotatable rings mounted on the base in a manner to be manually advanced each time one call is completed.

A further modification of the present invention proposes characterizing the movable counters by rotatably mounted units and tens discs with means for moving the units disc one number upon the completion of each call and which units disc will function to advance the tens disc one number each time the units disc has completed one revolution in a manner to register calls to a total of ninety-nine.

Still further, the present invention proposes the provision of means for restricting rotation of the units disc to one direction only so that it can only be moved in a direction to add to the total number of calls.

It is a further object of the present invention to provide a telephone call counter for attachment to the dial of a telephone which is simple and durable and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
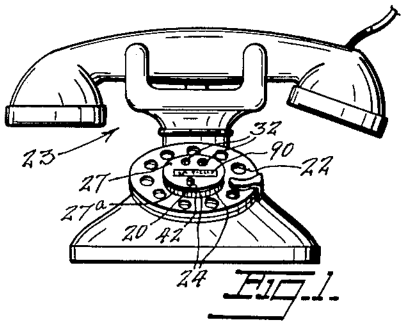
Fig. 1 is a front elevational view of a conventional dial telephone having a call counter in accordance with the present invention mounted on the dial thereof.

The call counter for attachment to the dial of a telephone, according to the first form of the present invention illustrated in Figs. 1 to 10, includes a base 20 which is constructed of metal, one of the synthetic resin materials or any other similar material. The bottom face of the base 20 is formed with a recess 21 by which the base is fitted into position on the dial 22 of a conventional telephone 23, see Fig. 1. The wall of the base 20 defining the recess 21 has an internal diameter just slightly smaller than the raised portion, not shown, at the center of the dial 22 so that the base can be frictionally slipped into position over that raised portion. To aid in the frictional gripping of the raised portion of the dial 22, the wall of the base 20 defining the recess 21 is formed wtih a plurality of slits 24 which increase the resiliency of the wall and so permit greater frictional contact between the inner faces of that wall and the periphery of the raised portion of the dial 22.

Counter 25 is mounted on the base 20 to register each call as it is completed. To accommodate counter 25, in this first form of the invention, the top of the base is hollowed out forming a cavity or compartment 26 for housing the counter. The open top of the cavity 26 is closed by a top wall 27 which has a depending skirt wall 27ᵃ which surrounds the outer periphery of the base 20. The wall 27 is secured in position by screws 28 which are threaded through contacting portions of the skirt wall 27ᵃ and the base 20.

Referring now particularly to counter 25, it will be noted from the drawings that it comprises a continuous units band 29 and a continuous tens band 30 arranged adjacent one another within the cavity 26 of the base 20. Each of the bands 29 and 30 is formed of flexible metal or synthetic resin and each band is somewhat wider than it is thick so as to be relatively stiff in a transverse direction. The outer faces of the bands 29 and 30 are imprinted with consecutive numerals 31 ranging from one to nine and zero, see particularly Fig. 10. The top wall 27 is formed with a pair of apertures constituting windows 32, see Figs. 2 and 3, arranged over the bands 29 and 30 and through which the numerals 31 can be viewed.

The units band 29 is supported over a pair of drums 33 and 34 and the tens band 30 is supported over a pair of like drums 35. The drums 33, 34 and 35 are rotatively mounted on suitable shafts 36 supported at their ends in suitable brackets 37 secured to the base wall of the cavity 26. Thus, each of the bands 29 and 30 and its respective drums are free for independent rotation relative to the shafts 36. Positioned on the shafts 36 there are spacers 38 for holding the drums properly spaced with relation to each other and with relation to the brackets 37, see particularly Fig. 5.

The drums 33 and 34 which support the units band 29 are alike in that each is formed intermediate of its end with a projecting collar 39 which rides in a retaining groove 40 formed in the inner face of the units band 29. The engagement of the collars 39 with the groove 40 acts to retain the units band 29 against lateral shifting with relation to the drums 33 and 34. The peripheries of the drums 33 and 34, on opposite sides of the collars 39, are covered by sleeves of rubber 41, see Figs. 5 and 8, which increases the frictional contact between the inner face of the units band 29 and the drums 33 and 34. That frictional contact is particularly important in the case of the drum 34 which is manually rotated to advance the units band 29 to bring its next numeral 31 into position in the aperture 32 of the top wall 27.

Manual rotation of the drum 34 to advance the units band 29 is accomplished by means of an enlarged annular flange 42 formed on the inner end of the drum 34 and which has its peripheral edge extended through a slot 43 in the top wall 27. The periphery of the flange 42 is provided with knurling 44 by which a finger grip can be had on the projecting portion of the flange 42 for turning the same to rotate the drum 34 and advance the units band 29 one numeral 31.

Figure 5:
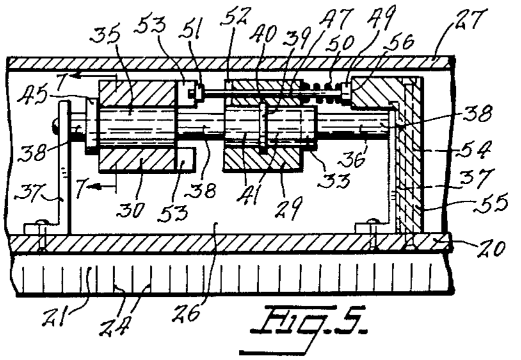
Fig. 5 is an enlarged partial transverse vertical sectional view taken on the line 5—5 of Fig. 3.
Figure 7:
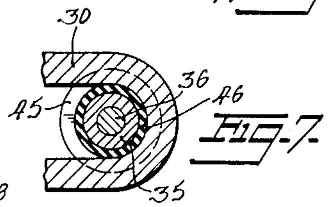
Fig. 7 is an enlarged detailed sectional view of the one end of the tens band taken substantially on the line 7—7 of Fig. 5.
Figure 8:
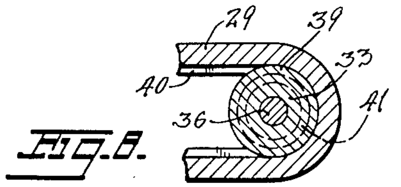
Fig. 8 is a view similar to Fig. 7, but of the units band.

The drums 35 which support the tens band 30 for rotative movement, are alike in construction and each is formed at its outer end with a flange 45 engaged by the outer edge of the tens band for retaining that band from moving laterally away from the units band 29. As shown in Figs. 5 and 7, each of the drums 35 is covered by a sleeve of rubber 46 for increasing the frictional contact between the inner faces of the tens band 30 and the drums 35.

Means is provided for automatically causing the tens band 30 to be advanced one numeral 31 each time the units band 29 completes one complete revolution. The automatic advancing means comprises a pin 47 which is slidably extended through a transverse passageway 48 formed in the units band 29 between the numerals zero and one. The outer end of the pin 47 has an enlarged head 49. An expansion spring 50 is coaxially wound on the pin 47 and operates between the outer edge of the units band 29 and the inner face of the head 49. The spring 50 functions to retain the pin 47 in a retracted position in which an abutment 51 on the inner end of the pin is drawn into a complementary recess 52 formed in the inner side of the units band 29, as shown most clearly in Fig. 6, so that the inner end of the pin 47 will clear the adjacent side of the flange 42 as the pin moves around the drum 34 with the units band 29.

Figure 10:
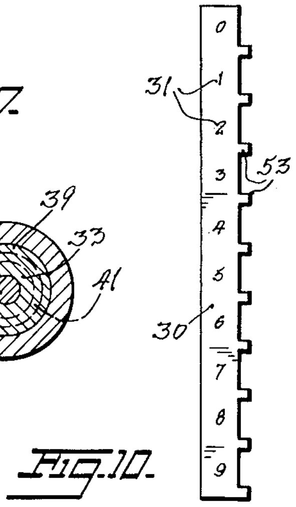
Fig. 10 is a developed view of the tens band, per se.
Figure 4:
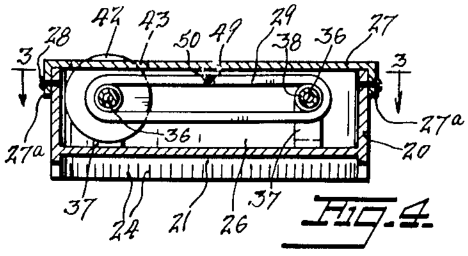
Fig. 4 is a vertical sectional view taken on the line 4—4 of Fig. 3.
Figure 9:
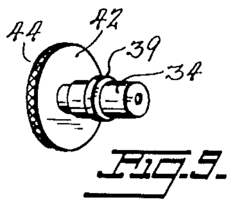
Fig. 9 is a perspective view of the drum which supports the one end of the units band.

The inner edge of the tens band 30 is formed with a plurality of laterally extending teeth 53 which extend toward the inner side of the units band 29. As shown in Fig. 10, the teeth 53 are ten in number with one tooth for each of the numerals 31 of the tens band 30. The teeth 53 are all evenly spaced with relation to one another.

Figure 6:
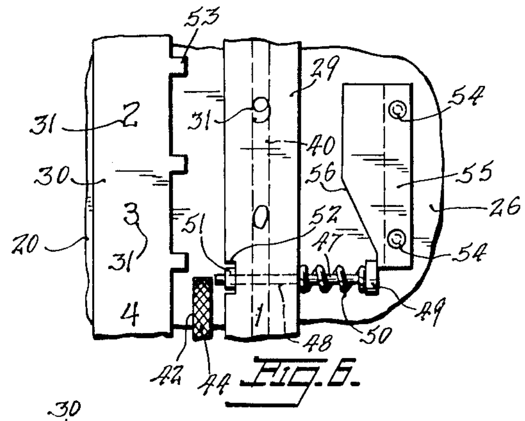
Fig. 6 is an enlarged detailed view of a portion of Fig. 3, but showing a different position of the parts.
Figure 3:
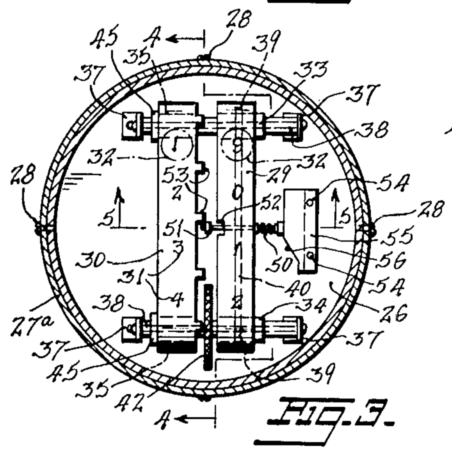
Fig. 3 is a horizontal sectional view of the call counter taken on the line 3—3 of Fig. 4.

Secured to the base wall of the cavity 26 by several rivets 54, there is a cam member 55 having an inwardly facing cam surface 56 aligned horizontally with the top run of the units band 29. The cam surface 56 is of a length and is positioned to effect inward pushing of the pin 47 against the action of the spring 50 to advance the tens band 30 the desired one numeral. Each time the units band 29 completes one complete revolution and its numeral eight is brought into view in the respective aperture 32, the head 49 of the pin 47 will be brought into position at the starting end of the cam surface 56, as shown in Fig. 6 of the drawing. When the units band 29 is next advanced to bring its numeral nine into alignment with the aperture 32, the head 49 will have moved along the cam surface 56 to the position shown in Fig. 3 in which the pin 47 will be pressed completely inward and its inner ends will be engaged behind the proper tooth 53 of the tens band 30. Advancement of the units band 29 to bring its zero numeral 31 into alignment with the aperture 32 will cause the head 49 to continue its movement along the cam surface 56 holding the pin 47 in its pressed in position and causing the tens band 30 to move concurrently with the units band 29 to bring the next numeral 31 into alignment with the respective aperture 32. As the zero numeral of the units band 29 and the next numeral of the tens band 30 move into alignment with the apertures 32, the head 49 will drop off the ending end of the cam surface 56. Immediately, the spring 50 will function to urge the pin 47 back to its starting position withdrawing the inner end of the pin 47 from behind the tooth 53 of the tens band 30. The tens band 30 will then retain that position for one complete revolution of the units band 29 when the pin 47 will again function to advance the tens band one numeral.

Thus, it is apparent that the counter can be used for counting a total of ninety-nine calls for any one single billing period. At the end of the billing period the total number of calls registered is noted and the flange 42 is manually rotated in one direction or the other to bring the bands 29 and 30 back to their starting position in which the zero numerals 31 are aligned with the apertures 32.

This call counter may be arranged with three or more bands similar to 29 and 30 so as to carry record nine hundred and ninety-nine calls or nine thousand nine hundred and ninety-nine calls by the use of the original knurled flange 42 or by the use of an additional similar operating knurled flange.

In the modified form of the telephone call counter shown in Figs. 11 to 13, the construction of the base 20' is similar to that described in connection with the base 20 as regards the recess 21 and slits 24 for mounting the call counter in position on the dial of a telephone.

The modified form of the invention differs only in the construction of the counter 25' for registering the completed calls. The base 20' has a flat top face and the counter 25' is characterized by a first movable member in the form of a tens ring 60 which is rested concentrically down on the top face of the base 20'. The tens ring 60 has an external diameter just slightly greater than the external diameter of the base 20' to have an outer edge portion project beyond the peripheral edge of the base 20' by which a grip can be had on the tens ring for turning the same.

Positioned over the tens ring 60, there is a retaining disc 61 having a diameter just slightly greater than the diameter of the tens ring so that serrations 60a on the periphery of the tens ring will not be exposed to be contacted causing the tens ring 60 to be accidentally turned while dialing the telephone. The serrations 60a provide a finger grip by which the periphery of the tens ring 60 can be gripped when desired for turning the same.

Figure 12:
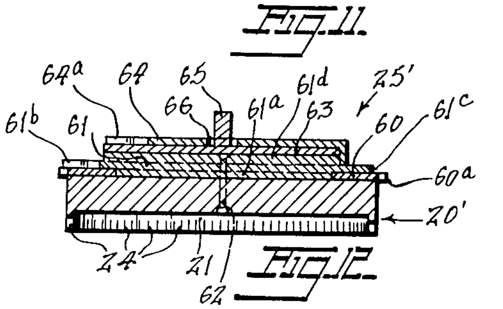
Fig. 12 is a transverse vertical sectional view taken on the line 12—12 of Fig. 11.

The retaining disc 61 is formed with a concentric depending portion 61a, see Fig. 12, which extends through the tens ring 60 and rests on the top face of the base 20'. The depending portion 61a is of a thickness just slightly less than the thickness of the tens ring 60 so as to frictionally retain the tens ring in the desired rotative positions while at the same time leaving it free for manual rotation. The retaining disc 61 is fixedly secured to the top face of the base 20' by several spaced rivets 62 which are extended through the base 20' and the retaining disc 61, see Fig. 12.

Figure 13:
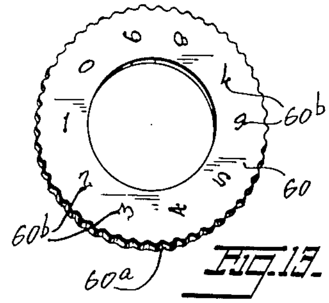
Fig. 13 is a perspective view of one of the counter rings used in the form of the invention shown in Figs. 11 and 12.

The top face of the tens ring 60 is formed or imprinted with the numerals $60^b$ ranging from one to nine and zero, see Fig. 13. At its left side, the retaining ring 61 is formed with a cutout $61^b$ through which the numerals $60^b$ can be successively viewed. Diametrically opposite the cutout $61^b$ or at its right side, the retaining ring 61 is formed with a shallow elongated notch $61^c$ of a depth to expose the serrations $60^a$ without exposing any of the numerals $60^b$.

Concentric with the depending portion $61^a$, the retaining disc 61 is formed with an upstanding portion $61^d$ upon which a second movable member in the form of a units disc 63 is rotatively positioned. The units disc 63 is the same diameter as the upstanding portion $61^d$ and has its top face formed with or imprinted with a series of numerals $63^a$ ranging from one to nine and zero, the same as the tens ring 60. The units disc 63 is retained rotatively in position on the top face of the upstanding portion $61^d$ by an inverted cup-shaped member 64 which is positioned down over the peripheries of the upstanding portion $61^a$ and the units disc 63, as shown in Fig. 12. The inverted cup-shaped member 64 has a force fit on the upstanding portion $61^a$ or is welded, soldered, braised or secured in any other manner to the upstanding portion $61^a$. In lateral alignment with the cutout $61^b$ of the retaining disc 61, the cup-shaped member 64 is formed with a cutout $64^a$ for consecutively exposing the numerals $63^a$ of the units disc 63 as that disc is turned.

To facilitate turning of the units disc 63, that disc is formed with a concentric upstanding knob 65 which is projected through a slightly enlarged hole 66 formed concentrically in the inverted cup-shaped member 64. With the knob 65 exposed through the hole 66, the units disc 63 can be conveniently turned for changing the numeral $63^a$ exposed in the cutout $64^a$. As each outgoing telephone call is completed, the units disc 63 is given a partial rotation to bring the next numeral $63^a$ into view in the respective cutout $64^a$. Each time a revolution of the units disc 63 is completed and its zero numeral is in view in the respective cutout $64^a$, the tens ring 60 must be given a partial rotation to bring its next numeral $60^d$ into alignment with the respective cutout $61^d$. At the end of the billing period the total number of calls recorded by the counter is noted and the ring 60 and disc 63 are turned back to their starting positions in which the zero numerals $60^b$ and $63^a$ are aligned with the respective cutouts $61^d$ and $64^a$ for the start of the next billing period.

Figure 11:
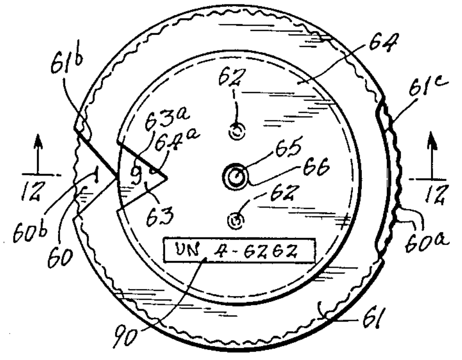
Fig. 11 is a plan view similar to Fig. 2, but illustrating the call counter constructed in accordance with a modification of the present invention.

In all other respects, the form of the invention shown in Figs. 11 to 13 is similar to that described in connection with Figs. 1 to 10 and like reference numerals are used to identify like parts.

The form of the invention shown in Figs. 14 to 18 is similar to that described in connection with Figs. 1 to 10 differing only in the construction of the counter 25″ mounted within the cavity 26 of the base 20. In this form of the invention, the movable counter 25″ is characterized by a units disc 70 and a tens disc 71. Each of the discs 70 and 71 has its top face imprinted with consecutive numerals 72 ranging from one to nine and zero so that as the discs are turned the numerals are brought into successive alignment with the apertures 32 in the top wall 27 to be viewed therethrough.

The discs 70 and 71 are rotatively supported on laterally spaced pins 73 which extend upward from the base wall of the cavity and the discs 70 and 71 are maintained at the proper elevation on the pins 73 with their adjacent portions overlapped by means of spacers 74 on the pins 73 upon which the bottom faces of the discs rest.

Figure 15:
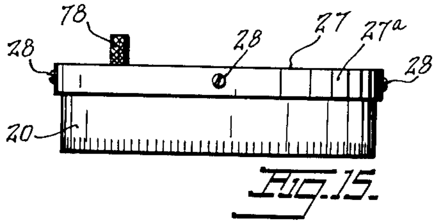
Fig. 15 is a side elevational view of Fig. 14.
Figures 17, 18:
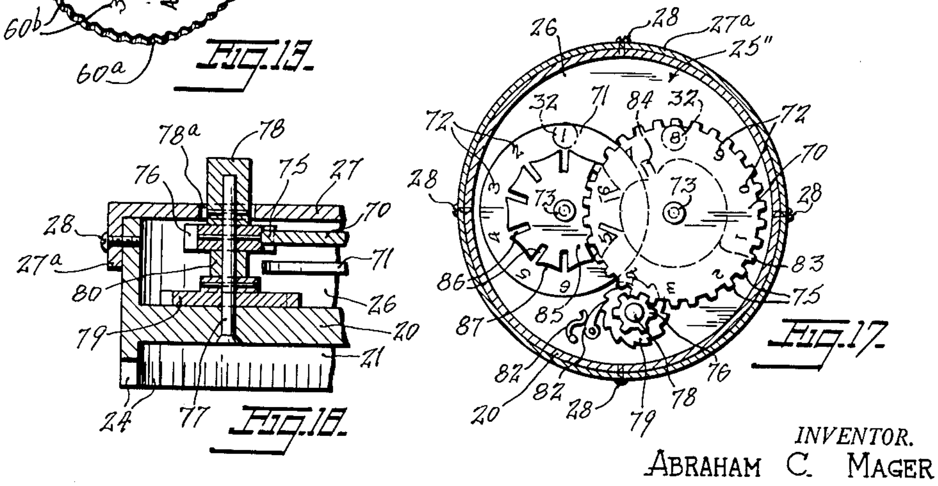
Fig. 17 is a horizontal sectional view taken on the line 17—17 of Fig. 16.
Fig. 18 is an enlarged partial vertical sectional view taken substantially on the line 18—18 of Fig. 14.

Means is provided for rotating the units disc 70 one numeral 72 each time an outgoing telephone call is completed. The rotating means comprises teeth 75 formed about the periphery of the units disc 70 and which are engaged by a complementary gear 76. The gear 76 is pinned to a rotative stud shaft 77 which extends vertically upward from the base wall of the cavity 26. Pinned to the upper end of the stud shaft 77, there is a knurled knob 78. The knob 78 extends through a hole $78^a$ in the top wall 27, as shown in Figs. 15 and 18, to be gripped for turning the stud shaft 77, the gear 76 and in turn the units disc 70.

Means is provided for restricting rotation of the stud shaft 77 to one direction to bring the next higher numeral 72 into alignment with the respective aperture 32. The rotation restricting means comprises a ratchet wheel 79 which is pinned to the stud shaft 77 below the gear 76. A spacer 80 is positioned on the stud shaft 77 between the gear 76 and the ratchet wheel 79. Pivotally mounted on the base wall of the cavity 26, there is a pawl 81 which is urged by a spring 82 into engagement with the teeth of the ratchet wheel 79 so as to restrict rotation of the shaft 77 to one direction only.

Figure 16:
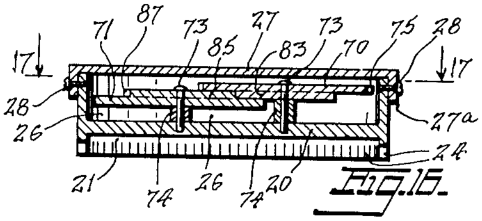
Fig. 16 is a transverse vertical sectional view taken on the line 16—16 of Fig. 14.

Each time the units disc 70 completes one revolution and that disc is turned to bring its zero numeral 72 into alignment with the respective aperture 32, a Geneva is provided for advancing the tens disc 71 to bring its next numeral 72 into alignment with the respective aperture 32. The Geneva is characterized by a plate 83 which is spot welded or otherwise secured to the bottom face of the units disc 70 to be an integral part thereof as shown in Fig. 16. Extending radially from one side of the plate 83, at a suitable location to function when the zero numeral is being brought into alignment with the aperture 32, there is a single tooth 84.

Secured to the top face of the tens disc 71, to be an integral unit therewith as shown in Fig. 16, there is a plate 85. The plate 85 is formed with ten radially extending slots 86 one for each of the numerals 72 of the tens disc. Each time the units disc 70 completes one revolution, its tooth 84 engages one of the slots 86 and advances the tens disc 71 one slot 86 bringing the next numeral 72 into alignment with the respective aperture 32. At all other times, the periphery of the plate 83 engages the arcuate surfaces 87, see particularly Fig. 17, about the periphery of the plate 85 between the outer ends of the slots 86 to hold the tens disc 71 stationarily in position.

In all other respects, the form of the invention shown in Figs. 14 to 17 is similar to that described in connection with Figs. 1 to 10 and like reference numerals are used throughout for like parts.

Figure 2:
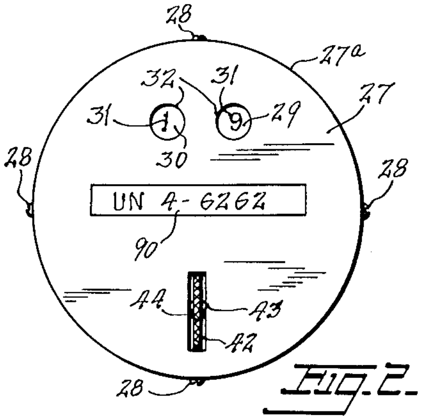
Fig. 2 is an enlarged plan view of the call counter, per se.
Figure 14:
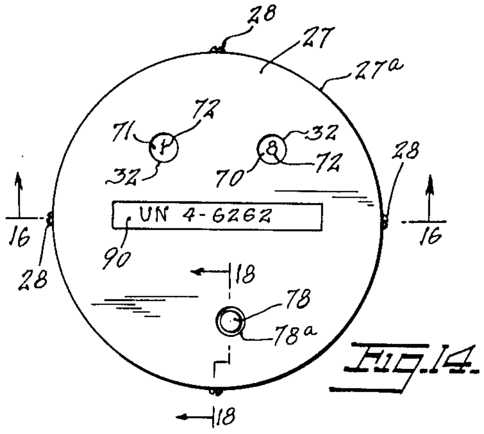
Fig. 14 is another view similar to Fig. 2, but illustrating a still further modification of the present invention.

Generally, the raised portions of telephone dials over which the call counters of the present invention are to be fitted, carry the call number of that particular telephone. Therefore, when the call counters of the present invention are in position on those raised portions, the call numbers will be covered and hidden from view. However, to overcome that difficulty and permit the call numbers to be displayed, notwithstanding the addition of the call counters, the top face of the top walls 27 and the top face of the retaining disc 63, see particularly Figs. 2, 11 and 14, are provided with areas 90 which are enameled or otherwise treated so that the particular call number of the telephone to which the counter is attached can be inscribed thereon using pencil, indelible pencil, pen and ink, crayon or the like. Thus, the call number of the telephone will be plainly in view on the top face of the counter.

However, if desired any other means can be provided for permitting the call number to be displayed on the exposed top faces of the call counters.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. The combination with a turnable dial of a telephone having a slightly raised circular central portion, of a call counter detachably mounted on said central portion, said counter comprising a base having a compartment formed therein, a top wall with depending skirt covering said compartment, said top wall having spaced windows and a slot therein, said base having a circular recess in its bottom face with a slitted wall portion fitted over said raised portion of the dial, pairs of drums rotatably mounted in alignment on the base in said compartment, an endless band movably supported on each pair of drums, said bands being movable behind said windows, one band carrying indicia constituting units, the other band carrying indicia constituting tens, manual means for moving the drum with the band carrying the units indicia across one of said windows, and means for automatically and intermittently moving said other drum with its band across the other window, said manual means including an annular flange fixed on said drum mounting the units carrying band and protruding outwardly of and beyond the slot in said top wall.

2. The combination with a turnable dial of a telephone having a slightly raised circular central portion, of a call counter detachably mounted on said central portion, said counter comprising a base having a compartment formed therein, a top wall with depending skirt covering said compartment, said top wall having spaced windows therein, said base having a circular recess in its bottom face with a slitted wall portion fitted over said raised portion of the dial, pairs of drums rotatably mounted in alignment on the base in said compartment, an endless band movably supported on each pair of drums, said bands being movable behind said windows, said bands carrying spaced indicia, manual means for moving one of said drums with its band across one of said windows, and means for automatically and intermittently moving said other drum with its band across the other window, said automatic means including spaced projections along the adjacent edge of the latter band, a spring-pressed pin slidably carried by said one band and projecting laterally of both edges thereof, one of said projecting ends extending to a point adjacent said adjacent edge of the other band, and being adapted to engage the projections thereon, the other projecting end of the pin having a head portion and a cam plate secured to the base in the compartment and having a camming face disposed in the path of movement of the head on said pin whereby said pin is slid into engagement with the projections on the edge of the other band for intermittently moving said other band.

References Cited in the file of this patent

UNITED STATES PATENTS

| | | |
|---|---|---|
| 198,934 | Fields | Jan. 8, 1878 |
| 200,259 | Clarke | Feb. 12, 1878 |
| 268,045 | See | Nov. 28, 1882 |
| 329,120 | Barber | Oct. 27, 1885 |
| 380,718 | Grissom | Apr. 10, 1888 |
| 434,425 | Cooper | Aug. 19, 1890 |
| 602,053 | Brodie | Apr. 12, 1898 |
| 602,918 | Sebastian | Apr. 26, 1898 |
| 808,454 | Kammerer | Dec. 26, 1905 |
| 835,844 | Bewan | Nov. 13, 1906 |
| 865,808 | Stump | Sept. 10, 1907 |
| 1,032,322 | Bly | July 9, 1912 |
| 1,109,378 | Ward | Sept. 1, 1914 |
| 1,496,544 | Johnson | June 3, 1924 |
| 1,600,766 | Larson | Sept. 21, 1926 |
| 1,765,445 | Porter | June 24, 1930 |
| 1,953,630 | Phillips | Apr. 3, 1934 |
| 2,129,265 | Duby | Sept. 6, 1938 |
| 2,188,823 | Stallman | Aug. 6, 1940 |
| 2,210,173 | Laugbart | Aug. 6, 1940 |
| 2,379,303 | Israel | June 26, 1945 |
| 2,516,592 | Richter | July 25, 1950 |

FOREIGN PATENTS

| | | |
|---|---|---|
| 56,670 | Germany | May 22, 1891 |